United States Patent
Huang

(10) Patent No.: US 10,441,109 B2
(45) Date of Patent: Oct. 15, 2019

(54) COLLAPSIBLE STOKING APPARATUS

(71) Applicant: Kuo-Chan Huang, Taichung (TW)

(72) Inventor: Kuo-Chan Huang, Taichung (TW)

(73) Assignee: INDUSTRO INTERNATIONAL CO., LTD., Taichung (TW)

( * ) Notice: Subject to any disclaimer, the term of this patent is extended or adjusted under 35 U.S.C. 154(b) by 0 days.

(21) Appl. No.: 15/299,082

(22) Filed: Oct. 20, 2016

(65) Prior Publication Data

US 2018/0333003 A1  Nov. 22, 2018

(51) Int. Cl.
F24C 3/14 (2006.01)
F24B 1/192 (2006.01)
A47J 37/07 (2006.01)

(52) U.S. Cl.
CPC ...... *A47J 37/079* (2013.01); *A47J 2037/0777* (2013.01)

(58) Field of Classification Search
CPC .......... F23G 5/44; F23G 5/46; A47J 37/0786; F24B 1/192; F24B 1/198; F24B 1/181; F24B 1/191; E04F 19/005; B32B 3/04; F24C 15/36; F24C 3/14; Y10S 160/09
See application file for complete search history.

(56) References Cited

U.S. PATENT DOCUMENTS

| | | | | | |
|---|---|---|---|---|---|
| 3,994,275 | A | * | 11/1976 | Williams | F24B 1/1957 126/552 |
| 4,048,979 | A | * | 9/1977 | LaVasseur | F24B 1/192 126/548 |
| 4,149,514 | A | * | 4/1979 | Latouf | A47J 37/0704 126/25 R |
| 4,531,505 | A | * | 7/1985 | Hait | F24C 1/16 126/25 R |
| D288,712 | S | * | 3/1987 | Catania | D23/406 |
| 4,829,975 | A | * | 5/1989 | Hait | A47J 37/0763 126/152 B |
| 4,877,010 | A | * | 10/1989 | Hait | F24C 1/16 126/9 A |
| 4,922,887 | A | * | 5/1990 | Foxford | A47J 37/0713 126/29 |
| 4,971,032 | A | * | 11/1990 | Gardner | F24B 1/192 126/547 |
| 5,188,091 | A | * | 2/1993 | Gardner | F24B 1/192 126/201 |
| 5,495,845 | A | * | 3/1996 | Hait | F24C 3/14 126/25 R |

(Continued)

*Primary Examiner* — Gregory A Wilson
(74) *Attorney, Agent, or Firm* — Bruce Stone LLP; Joseph Bruce

(57) ABSTRACT

A stoking apparatus includes two concealable panels, a bent covering panel and a flat covering panel. The concealable panels are pivotally connected to each other. The bent covering panel includes a major portion and a minor portion, with an angle between the major and minor portions. The major portion is pivotally connected to one of the concealable panels. The minor portion is pivotally connected to the flat covering panel. The flat covering panel is further pivotally connected to the other concealable panel. The minor portion provides a gap between the major portion and the flat covering panel to receive the first and second concealable panels when the collapsible stoking apparatus is in a collapsed position.

7 Claims, 6 Drawing Sheets

(56) References Cited

U.S. PATENT DOCUMENTS

| | | | | |
|---|---|---|---|---|
| 5,664,556 A * | 9/1997 | Byers | ............... | F24B 1/1957 |
| | | | | 126/500 |
| 5,979,434 A * | 11/1999 | Bilanzich | ............ | A47C 7/66 |
| | | | | 126/204 |
| 2005/0115556 A1* | 6/2005 | Carson | ............ | A47J 37/0786 |
| | | | | 126/25 R |
| 2008/0078377 A1* | 4/2008 | Gardner | ............ | F24B 1/192 |
| | | | | 126/548 |
| 2010/0288263 A1* | 11/2010 | Sykes | ............... | F24B 1/181 |
| | | | | 126/519 |
| 2012/0112148 A1* | 5/2012 | Hammond | ........ | A62C 99/00 |
| | | | | 256/19 |
| 2016/0338535 A1* | 11/2016 | Witsch | ............ | A47J 37/0704 |
| 2018/0372324 A1* | 12/2018 | Gamble | ............ | F24B 1/192 |

\* cited by examiner

COLLAPSIBLE STOKING APPARATUS

BACKGROUND OF INVENTION

1. Field of Invention

The present invention relates to stoking and, more particularly, to a collapsible stoking apparatus.

2. Related Prior Art

A typical non-collapsible stoking apparatus includes a tubular body made by bending a piece of metal. In use, charcoal or wood is put in the stoking apparatus before the charcoal or wood is set on fire. The stoking apparatus is used to shield flames from strong wind that could otherwise blows out the flames. However, such non-collapsible stoking apparatus is quite bulky when it is not in use.

U.S. Pat. No. 5,682,872 discloses a camping furnace including two or three separable sections 24 that can be connected to one another by hinge pins 19. The separable sections 24 are arched metal strips that cannot be overlapped without first removing all of the hinge pins 19 from them. Such a process is troublesome.

U.S. Pat. No. 8,028,689 discloses a charcoal starter 10 including six panels 20, 22, 24, 26, 28 and 30 that are pivotally connected to one another by hinges. The panels 20 and 26 are large panels while the panels 22, 24, 28 and 30 are small panels. The charcoal starter 10 can be expanded to provide a square profile. The panel 22 can be pivoted to the panel 24, and the panel 28 to the panel 30, to bring the panel 20 toward the panel 26. Thus, the charcoal starter 10 is collapsed. Such collapsing of the charcoal starter 10 is convenient. The manufacturing of the charcoal starter 10 is complicated because the charcoal starter 10 includes quite a few components.

U.S. Pat. No. 8,028,689 further discloses a charcoal starter 110 including four panels 120, 122, 124 and 126. The panels 120 and 126 are large panels while the panels 122 and 124 are small panels. The panel 120 is pivotally connected to the panel 126 by a large hinge 140. The panel 120 is pivotally connected to the panel 122 by a small hinge. The panel 122 is pivotally connected to the panel 124 by another small hinge. The panel 124 is pivotally connected to the panel 126 by another small hinge. The charcoal starter 110 can be expanded to provide a triangular profile. The panel 122 can be pivoted to the panel 124 to bring the panel 120 toward the panel 126. Thus, the charcoal starter 110 is collapsed. Such collapsing of the charcoal starter 10 is convenient. The manufacturing of the charcoal starter 10 is complicated because the charcoal starter 10 is provided with hinges of different sizes.

The present invention is therefore intended to obviate or at least alleviate the problems encountered in prior art.

SUMMARY OF INVENTION

It is an objective of the present invention to provide a convenient and simple collapsible stoking apparatus.

To achieve the foregoing objective, the stoking apparatus includes a first concealable panel, a second concealable panel, a bent covering panel and a flat covering panel. The second concealable panel includes an edge pivotally connected to an edge of the first concealable panel. The bent covering panel includes a major portion and a minor portion. The major portion is made with an area marginally larger than that of the concealable panels and an edge pivotally connected to another edge of the first concealable panel. The minor portion extends from an opposite edge of the major portion, with an angle between the major and minor portions. The flat covering panel is made with an area substantially identical to that of the major portion, an edge pivotally connected to an edge of the minor portion, and another edge pivotally connected to another edge of the second concealable panel. There is an angle between the first and second concealable panels when the collapsible stoking apparatus is in an extended position. The angle between the first and second concealable panels is substantially identical to the angle between the major and minor portions. The angle between the first and second concealable panels and the angle between the major and minor portions are located at two ends of a diagonal line. The minor portion provides a gap between the major portion and the flat covering panel to receive the first and second concealable panels when the collapsible stoking apparatus is in a collapsed position.

In another aspect, the collapsible stoking apparatus further includes a grill supported on the panels when the stoking apparatus is in the extended position.

In another aspect, at least one of the panels further includes at least one edge for supporting a portion of the grill while at least another one of the panels comprises at least one clip for supporting another portion of the grill.

In another aspect, each of the first and second concealable panels is a trapezoidal plate, and the flat covering panel is a trapezoidal plate, and the major portion panel is a trapezoidal portion.

In another aspect, one of the panels includes at least one aperture or slot.

In another aspect, the major portion includes two loops adapted for receiving two ends of a handle.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
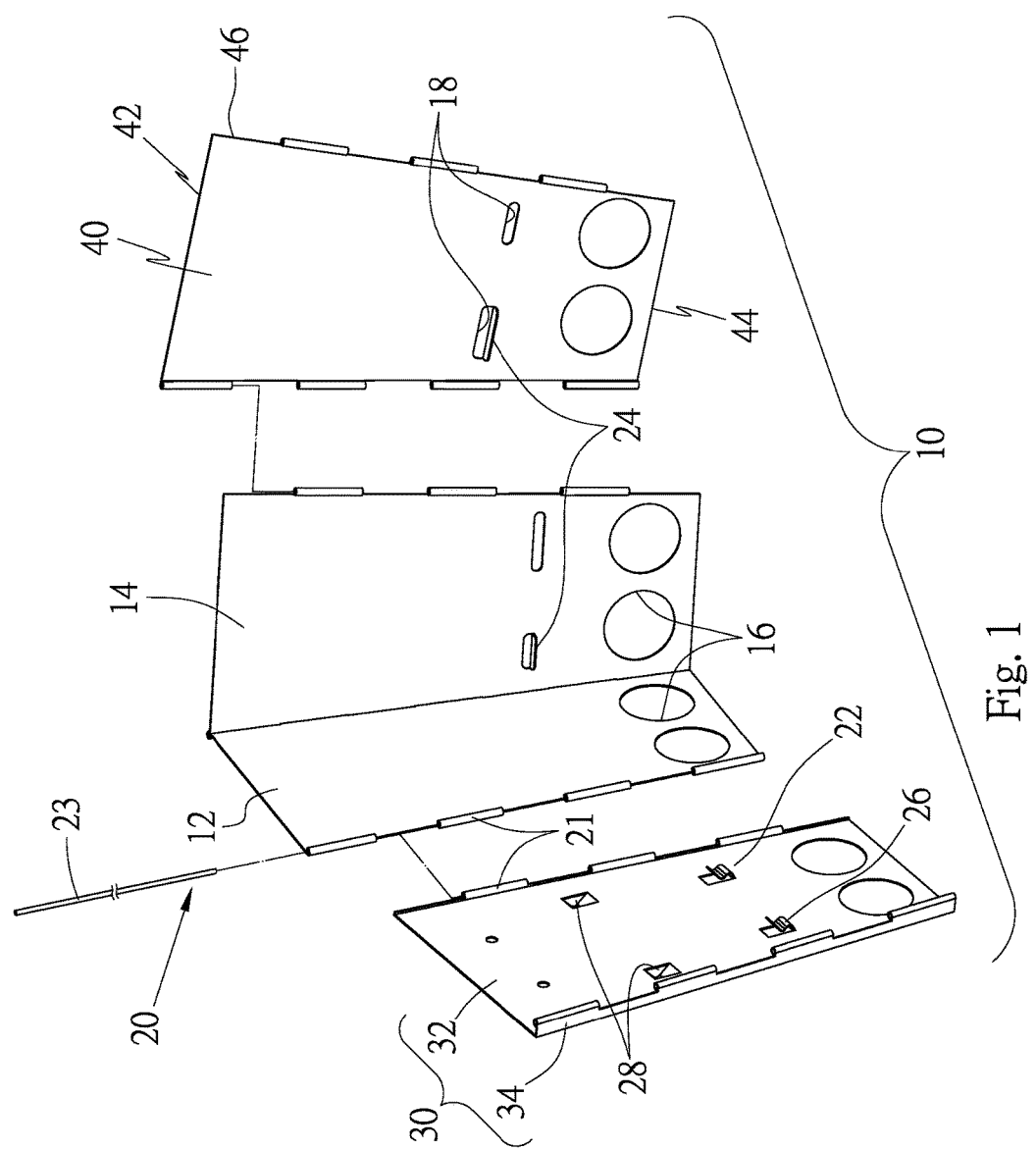
FIG. 1 is an exploded view of a collapsible stoking apparatus according to the preferred embodiment of the present invention.
Figure 2:
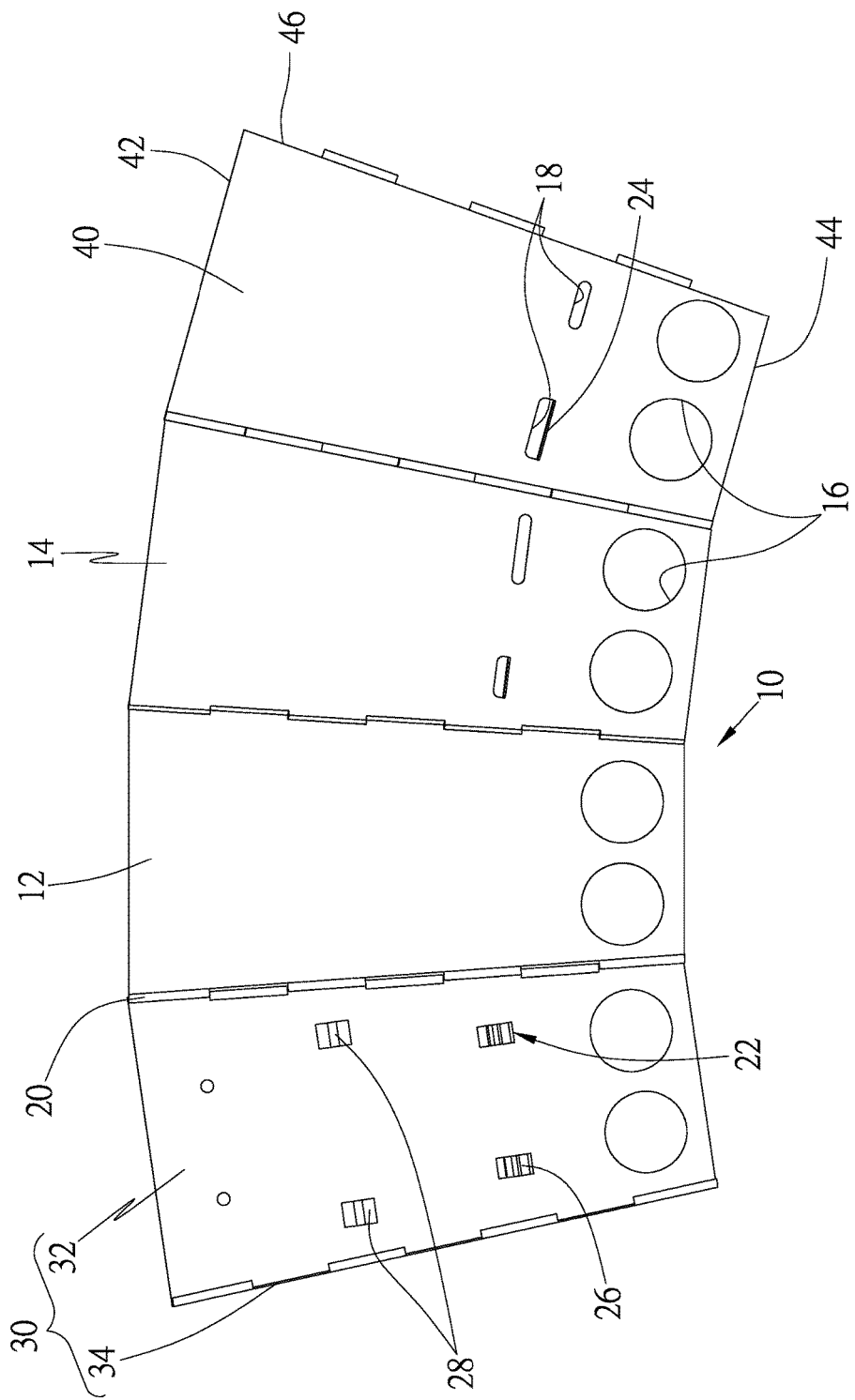
FIG. 2 is a front view of the collapsible stoking apparatus shown in FIG. 1.

Referring to FIGS. 1 and 2, a stoking apparatus 10 includes four panels 12, 14, 30 and 40 and several hinges 20 according to the preferred embodiment of the present invention. Each of the hinges 20 includes two rows of sleeves 21 and a pin 23. Each of the sleeves 21 is located at a corresponding one of two opposite edges of each of the panels 12, 14, 30 and 40. Each of the pins 23 is inserted two alternate ones of the rows of sleeves 21. The hinges 20 allow a certain degree of pivoting of the panels 12, 14, 30 and 40 relative to one another. The sleeves 21 include a same diameter. Thus, the hinges 20 are made of a same size.

Figure 5:
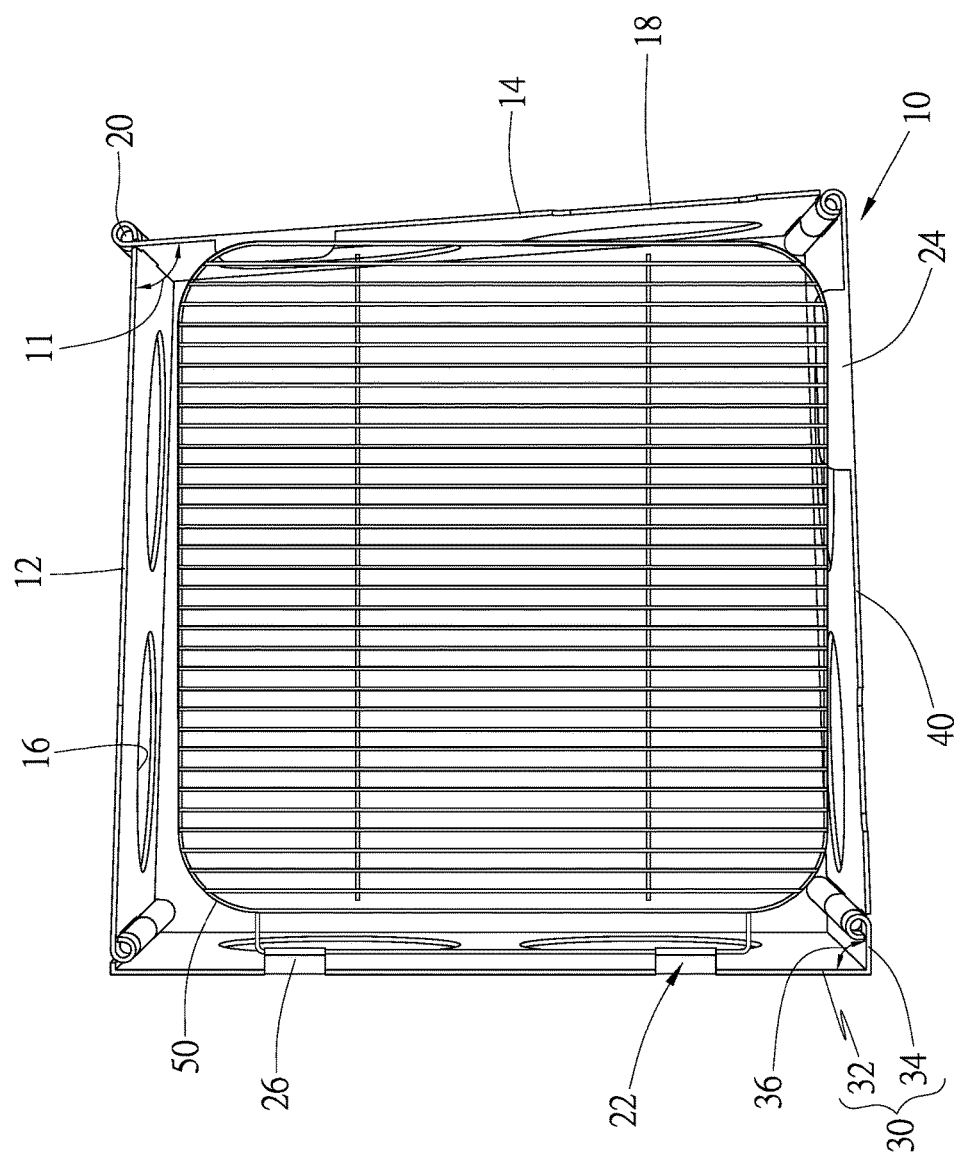
FIG. 5 is a top view of the grill supported and the collapsible stoking apparatus shown in FIG. 4.

The panel 30 includes a major portion 32 and a minor portion 34, with an angle 36 between the major portion 32 and the minor portion 34 (FIG. 5). The area of the major portion 32 of the panel 30 is the same as the area of the panels 12 and 14. The major portion 32 includes an edge pivotally connected to an edge of the panel 12 by one of the hinges 20. Thus, the minor portion 34 of the panel 30 and the panel 12 are on different sides of the major portion 32 of the panel 30.

An edge of the panel 40 is connected to an edge of the panel 14 by one of the hinges 20. Another edge of the panel 40 is connected to the minor portion 34 of the panel 30 by another one of the hinges 20. Thus, the sum of the area of the panel 40 and the area of the minor portion 34 of the panel 30 is identical to the area of each of the panels 12 and 14.

Each of the panels 12, 14, 30 and 40 is a trapezoidal metal plate. For example, the panel 40 includes an upper edge 42, a lower edge 44 and two lateral edges 46. The upper edge 42 extends parallel to the lower edge 44. The upper edge 42 extends longer than the lower edge 44. Each of the lateral edges 46 interconnects the upper edge 42 and the lower edge 44. Thus, the stoking apparatus 10 can spread like a fan.

Figure 3:
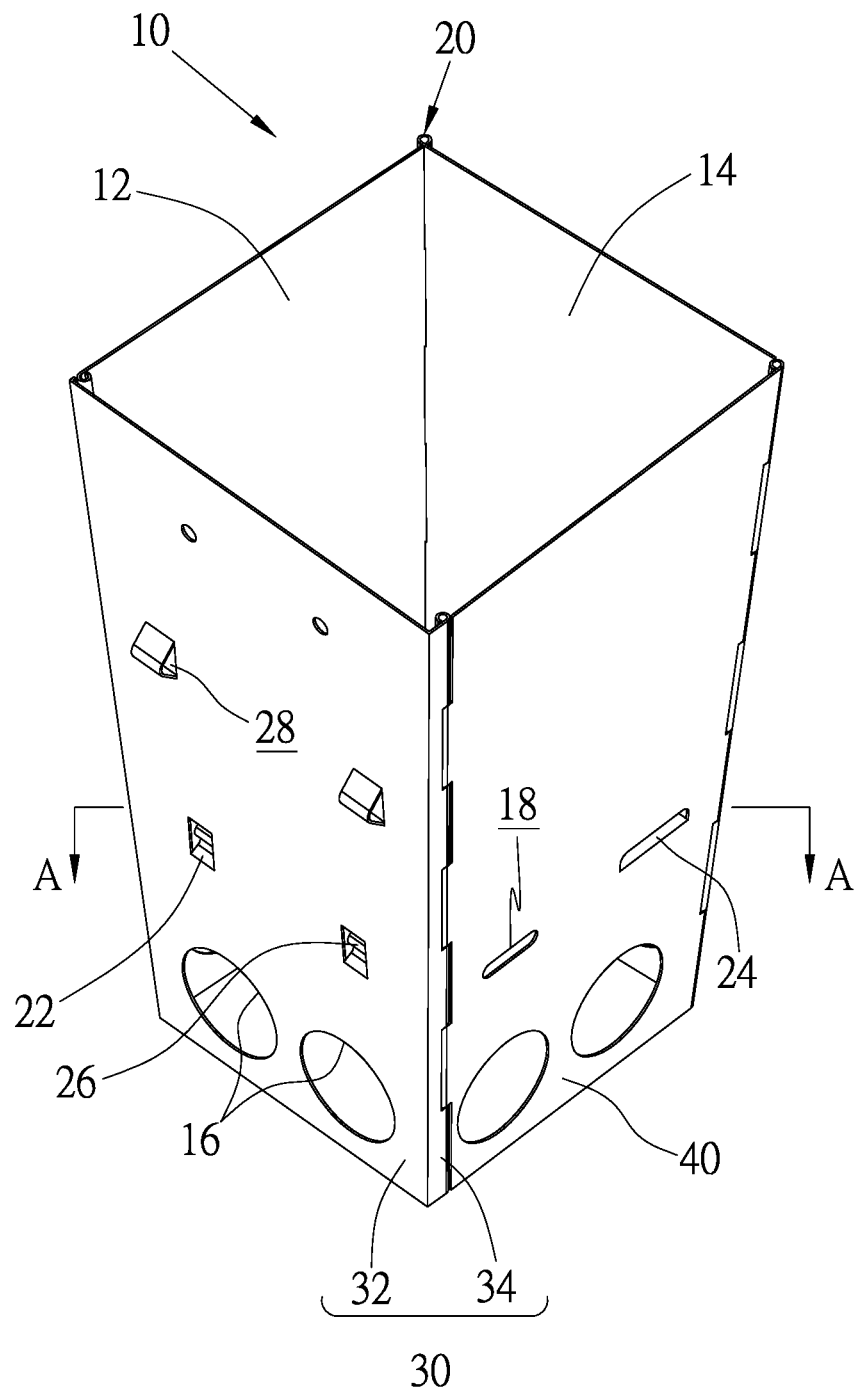
FIG. 3 is a perspective view of the collapsible stoking apparatus in another position than shown in FIG. 2.

Each of the panels 12, 14, 30 and 40 includes two apertures 16 near the lower edge 44. The panel 14 further includes two slots 18 and a ledge 24 extending below one of the slots 18. The ledge 24 is in the form of a horizontal fin. The panel 30 further includes two clips 26 extending from an internal side of the major portion 32 and two loops 28 extending from an external side of the major portion 32 (FIG. 3). The loops 28 are adapted for receiving two ends of a handle (not shown). The panel 40 further includes two slots 18 and a ledge 24 extending below one of the slots 18. In another embodiment, each of the ledges 24 can be replaced with a clip 26 while each of the clips 26 can be replaced with a ledge 24.

Figure 4:
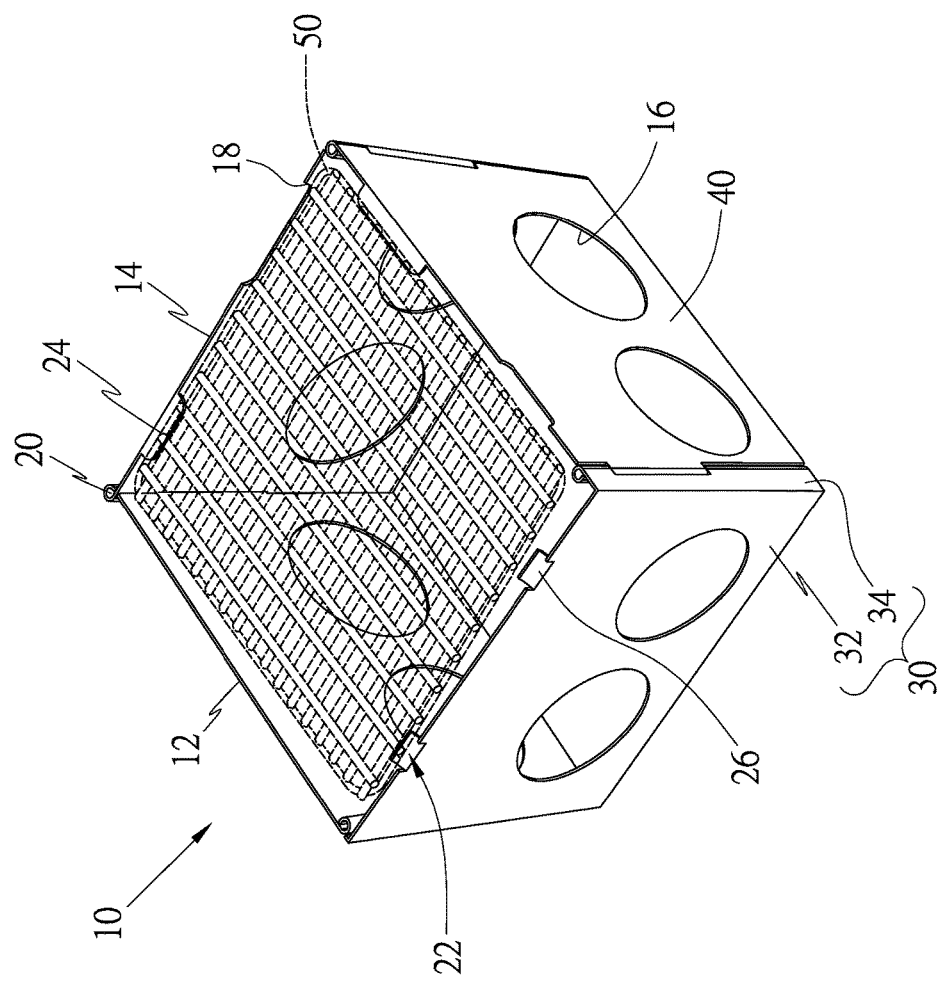
FIG. 4 is a perspective view of a grill supported on the collapsible stoking apparatus shown in FIG. 3.

Referring to FIGS. 3 to 5, the collapsible stoking apparatus 10 is in an extended position. There is an angle 11 between the panels 12 and 14. The stoking apparatus 10 provides a square profile. Hence, the angles 11 and 36 are located at two ends of diagonal line. The angles 11 and 36 are identical to each other, about 90°±5°.

Now, the panel 14 is located opposite to the panel 30. The ledge 24 of the panel 14 is located opposite to the clips 26 of the panel 30. The ledge 24 of the panel 14, the clips 26 of the panel 30 and the ledge 24 of the panel 40 together support a grill 50 located in the collapsible stoking apparatus 10.

Figure 6:
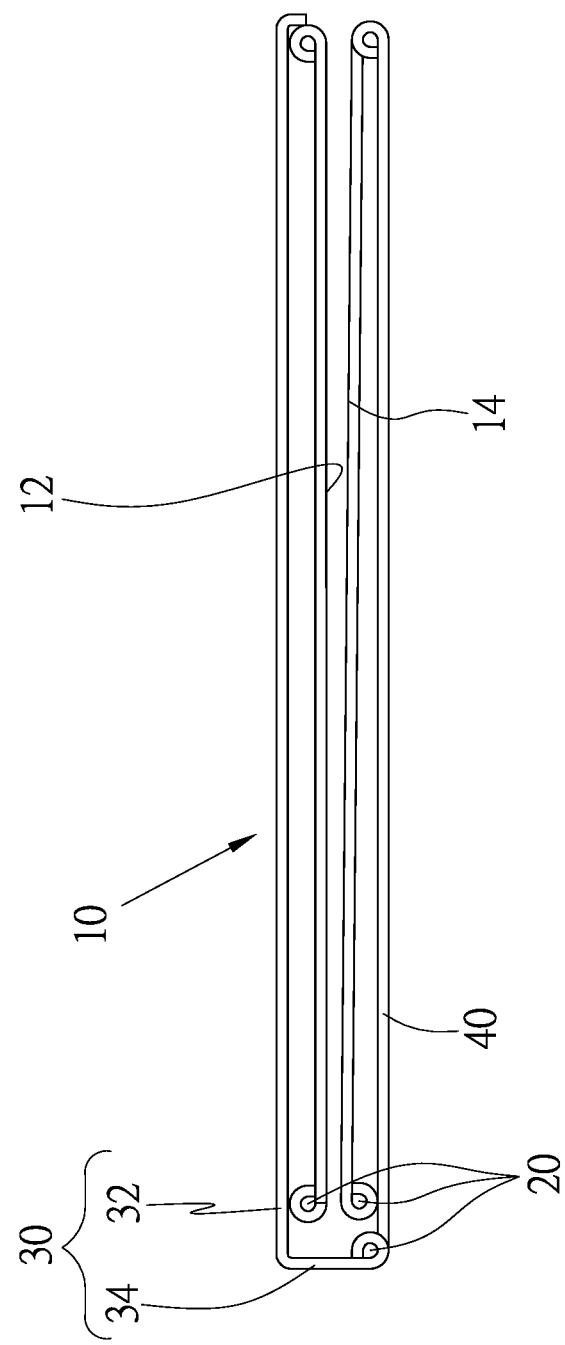
FIG. 6 is a top view of the collapsible stoking apparatus in another collapsed position than shown in FIG. 3.

Referring to FIG. 6, the collapsible stoking apparatus 10 is in a collapsed position. The panel 40 is located close to the major portion 32 of the panel 30, and the panel 12 is located to the panel 14. The panels 12 and 14 are located between the panel 40 and the major portion 32 of the panel 30. The minor portion 34 of the panel 30 provides a gap between the major portion 32 of the panel 30 and the panel 40 to receive the panels 12 and 14, without interfering with the hinge 20 provided between the minor portion 34 of the panel 30 and the panel 40.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A collapsible stoking apparatus comprising:
   a first concealable panel comprising a first edge and a second edge;
   a second concealable panel comprising a first edge and a second edge, wherein the second edge of the second concealable panel is pivotally connected to the second edge of the first concealable panel;
   a bent covering panel comprising:
      a major portion comprising an area marginally larger than that of the first and second concealable panels and an edge pivotally connected to the first edge of the first concealable panel; and
      a minor portion extending from the major portion, with an angle between the major and minor portions; and
   a flat covering panel made with an edge pivotally connected to an edge of the minor portion of the bent covering panel and another edge pivotally connected to the first edge of the second concealable panel;
   wherein there is an angle between the first and second concealable panels when the collapsible stoking apparatus is in an extended position, and the angle between the first and second concealable panels is substantially identical to the angle between the major and minor portions, and the angle between the first and second concealable panels and the angle between the major and minor portions are located at two ends of a diagonal line; and
   wherein the minor portion of the bent covering panel provides a gap between the major portion of the bent covering panel and the flat covering panel to receive the first and second concealable panels so that the first and second concealable panels are concealed by the bent and flat covering panels and that the minor portion of the bent covering panel covers the second edges of the first and second covering panels when the collapsible stoking apparatus is in a collapsed position.

2. The collapsible stoking apparatus according to claim 1, further comprising a grill supported on the panels when the stoking apparatus is in the extended position.

3. The collapsible stoking apparatus according to claim 2, wherein at least one of the panels further comprises at least one edge for supporting a portion of the grill while at least another one of the panels comprises at least one clip for supporting another portion of the grill.

4. The collapsible stoking apparatus according to claim 1, wherein each of the first and second concealable panels is a trapezoidal plate, wherein the flat covering panel is a trapezoidal plate, wherein the major portion panel is a trapezoidal portion.

5. The collapsible stoking apparatus according to claim 1, wherein one of the panels comprises at least one aperture.

6. The collapsible stoking apparatus according to claim 1, wherein one of the panels comprises at least one slot.

7. The collapsible stoking apparatus according to claim 1, wherein the major portion comprises two loops adapted for receiving two ends of a handle.

* * * * *